United States Patent [19]

Neufeldt

[11] 4,280,780
[45] Jul. 28, 1981

[54] REFUSE CONTAINER

[76] Inventor: Jacob J. Neufeldt, c/o Neufeldt Industries Ltd., P.O. Box 597, Lethbridge, Alberta, Canada, T1J 3Z4

[21] Appl. No.: 45,668

[22] Filed: Jun. 5, 1979

[30] Foreign Application Priority Data

Apr. 5, 1979 [CA] Canada ................................ 324965

[51] Int. Cl.³ .................... B65G 67/04; B65F 3/00
[52] U.S. Cl. ............................. 414/572; 222/166; 232/43.5; 414/399; 414/680
[58] Field of Search .............. 414/373, 403, 404, 406, 414/421, 572, 680, 399; 232/43.1, 43.5; 220/1 T; 298/11; 222/166

[56] References Cited

U.S. PATENT DOCUMENTS

| 525,103 | 8/1894 | Heidsieck | 414/680 X |
| 3,057,498 | 10/1962 | Wheat | 414/421 |
| 3,137,402 | 6/1964 | Gunn, Jr. | 414/421 |
| 3,730,396 | 5/1973 | Harper et al. | 222/166 |

FOREIGN PATENT DOCUMENTS

| 125920 | 5/1910 | Canada . | |
| 141851 | 7/1912 | Canada . | |
| 168647 | 4/1916 | Canada . | |
| 179248 | 9/1917 | Canada . | |
| 210468 | 4/1921 | Canada . | |
| 853518 | 10/1970 | Canada . | |

Primary Examiner—Andres Kashnikow
Attorney, Agent, or Firm—Larson and Taylor

[57] ABSTRACT

A self dumping refuse container assembly comprises a support frame adapted to be attached to a secure supporting surface and a container mounted on the frame for pivotal movement in a vertical plane between a lower, normally upright position for receiving refuse material and an elevated, at least partially inverted position for discharging refuse into a refuse collecting vehicle or the like. The container includes at least one refuse material intake opening in which a feed chute is located. The container also includes a refuse material discharge opening. A lid member is connected to the container for pivotal movement between a closed position overlying the discharge opening and an open position under the influence of gravity as the container is moved between the lower and elevated positions. A motor is provided for moving the container between its lower and elevated positions.

23 Claims, 6 Drawing Figures

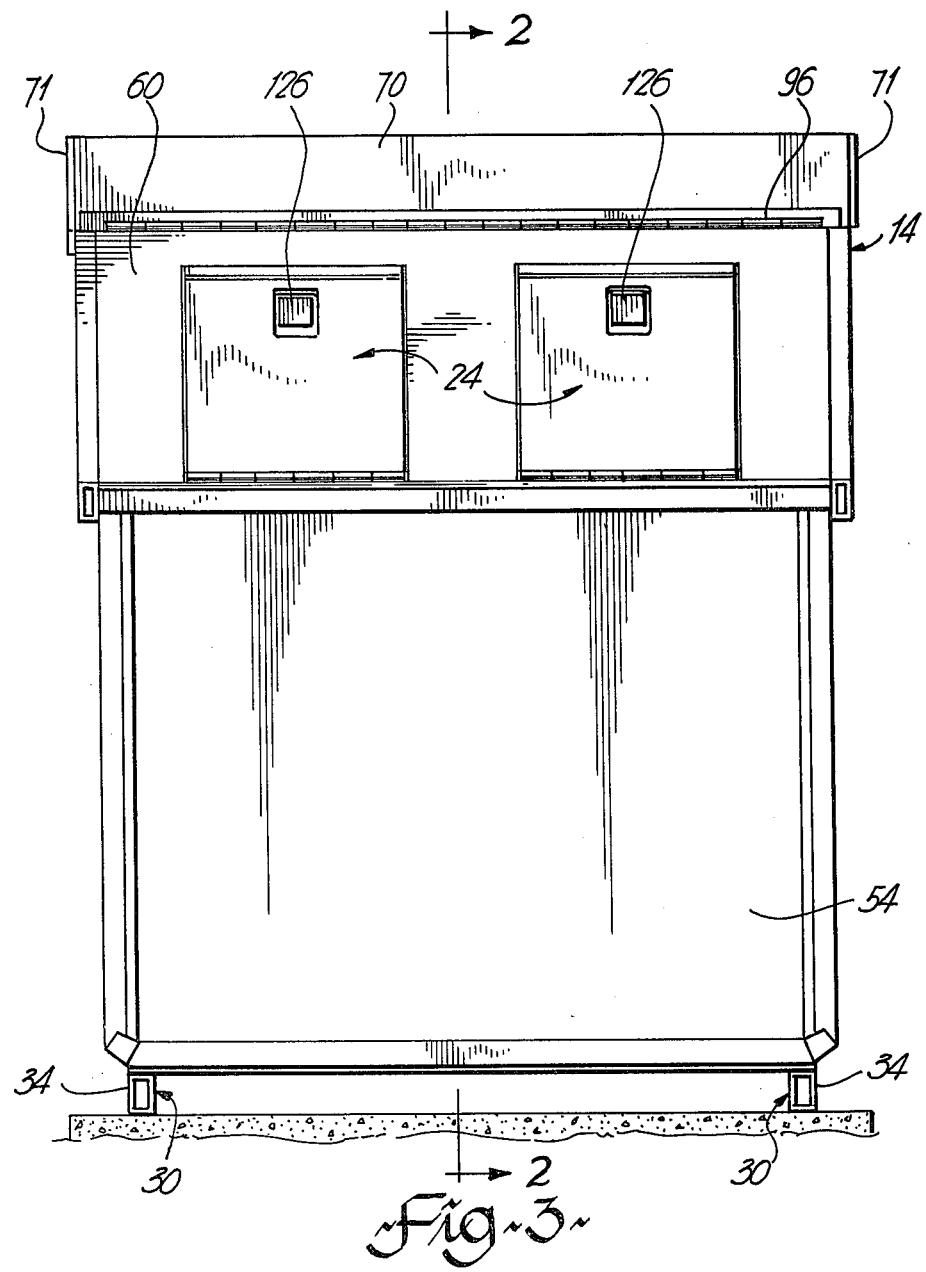

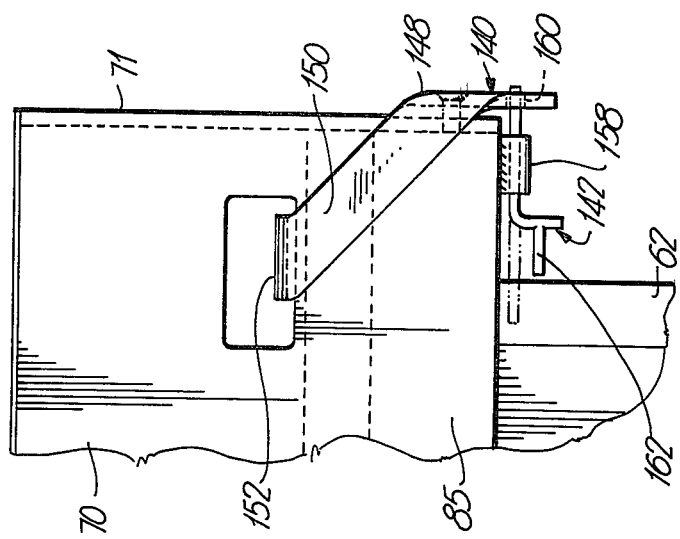
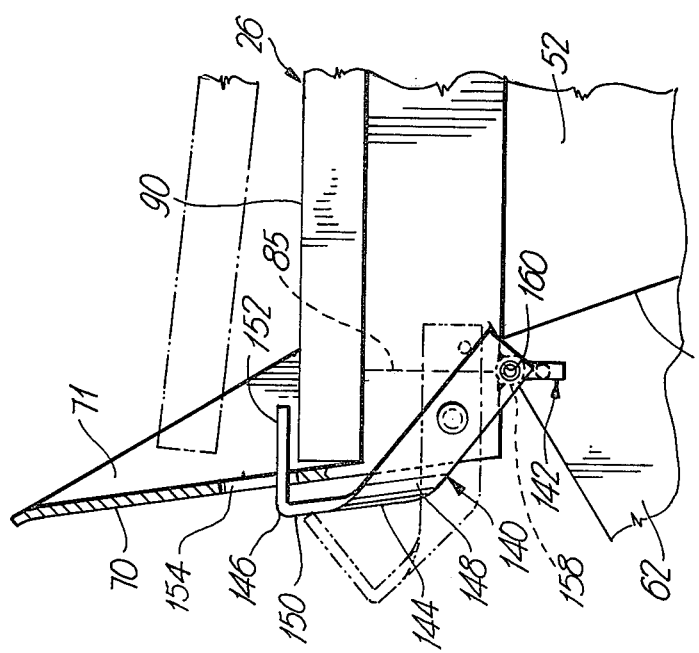

REFUSE CONTAINER

This invention relates to a refuse containing apparatus and, particularly, to an apparatus for use in parks, campgrounds and any such areas where scavenging animals, such as bears, tend to frequent.

BACKGROUND OF THE INVENTION

Various types of animal-proof refuse containers have been proposed for use in parks, campgrounds and the like. Bears, wolves and deer are particularly powerful animals and normally have little difficulty in upsetting refuse containers and spreading the contents thereof throughout the campgrounds. It is obvious that such animals not only create a mess but also present a danger to campers and vacationers and, accordingly, it would be desirable to discourage their visits to campgrounds.

One attempt at overcoming the foregoing problem was to provide a small building having a door which can be locked and which contains refuse containers either of the conventional, metal or plastic garbage bags of the type normally used for domestic use. While such a building is normally effective to keep scavenging animals away from the refuse, there are a number of drawbacks. Firstly, it is not economically feasible or aesthetically pleasing to provide as many buildings as there are necessary to adequately service the campgrounds or parks. As a result, the buildings tend not to be used and the problem is not solved. Secondly, because the buildings have a relatively large capacity, they are generally not emptied as frequently as they should be and this results in an unpleasant odor in the vicinity of the building. This, in turn, renders the task of emptying the building rather unpleasant. Thirdly, again because of the large capacity, it is time consuming to manually empty the buildings. Fourthly, the buildings tend to attract vermin. Thus, this solution has a number of significant disadvantages.

Another attempt at overcoming this problem was to provide special enclosures for conventional domestic refuse cans. Generally, such enclosures tend to be in the form of concrete boxes which normally enclose two refuse cans and have one open side wall provided with a single removable steel bar. It has been found that bears have had no difficulty in removing the bar and thereby attaining access at the refuse containers. In addition, the containers and enclosures tend to be unsightly.

A still further attempt involves the use of commercial heavy steel refuse containers having a capacity of five to six cubic yards. These containers are emptied by conventional refuse collection vehicles having front end overloaders. It has been found that bears have had little difficulty in upsetting these containers. Furthermore, such containers require refuse vehicles which do not operate efficiently in such an environment.

Still another solution to the aforementioned difficulty is the provision of a conventional refuse can fitted with a special cover reciprocably mounted on an upright post anchored into a concrete slab upon which the container sits. Such containers have low capacity, are inconvenient to empty and are not entirely animal-proof.

SUMMARY OF THE INVENTION

Thus, the present invention is directed to a refuse containing apparatus which overcomes the above-discussed disadvantages. Generally, the present invention provides an apparatus which is animal-proof both in terms of scavenging animals, such as bears, and vermin. In addition, the present apparatus is readily emptied, can be designed to be of such a size that an adequate number can be conveniently located throughout a campground or park, and is aesthetically pleasing.

Thus, the present invention provides an apparatus having a frame member which is adapted to be secured to a rigid supporting surface such as the ground or an appropriate concrete slab or the like. A refuse container is pivotally mounted on the frame for pivotal movement in a vertical plane from a lower material receiving position to an upper material discharge position. The apparatus includes means for mechanically pivoting the container from the material receiving position to the material discharge position to permit easy and effortless emptying of the container. The container is formed with at least one material receiving opening and one material discharge opening which may or may not be the same as the material receiving opening. Lid means are provided to close the openings and are provided with latch means which can be readily actuated by humans but which can not be actuated by animals.

These and other features and aspects of the invention will become clear from the description which follows in which reference is made to the appended drawings, wherein:

BRIEF DESCRIPTION OF THE DRAWINGS

FIG. 3 is an end view of the present apparatus illustrating the container in a material receiving position;

FIG. 4 is a side view of a latch means for securing the discharge opening lid means;

FIG. 5 is a rear view of the latch means of FIG. 4; and

DETAILED DESCRIPTION OF THE INVENTION

Figure 1:
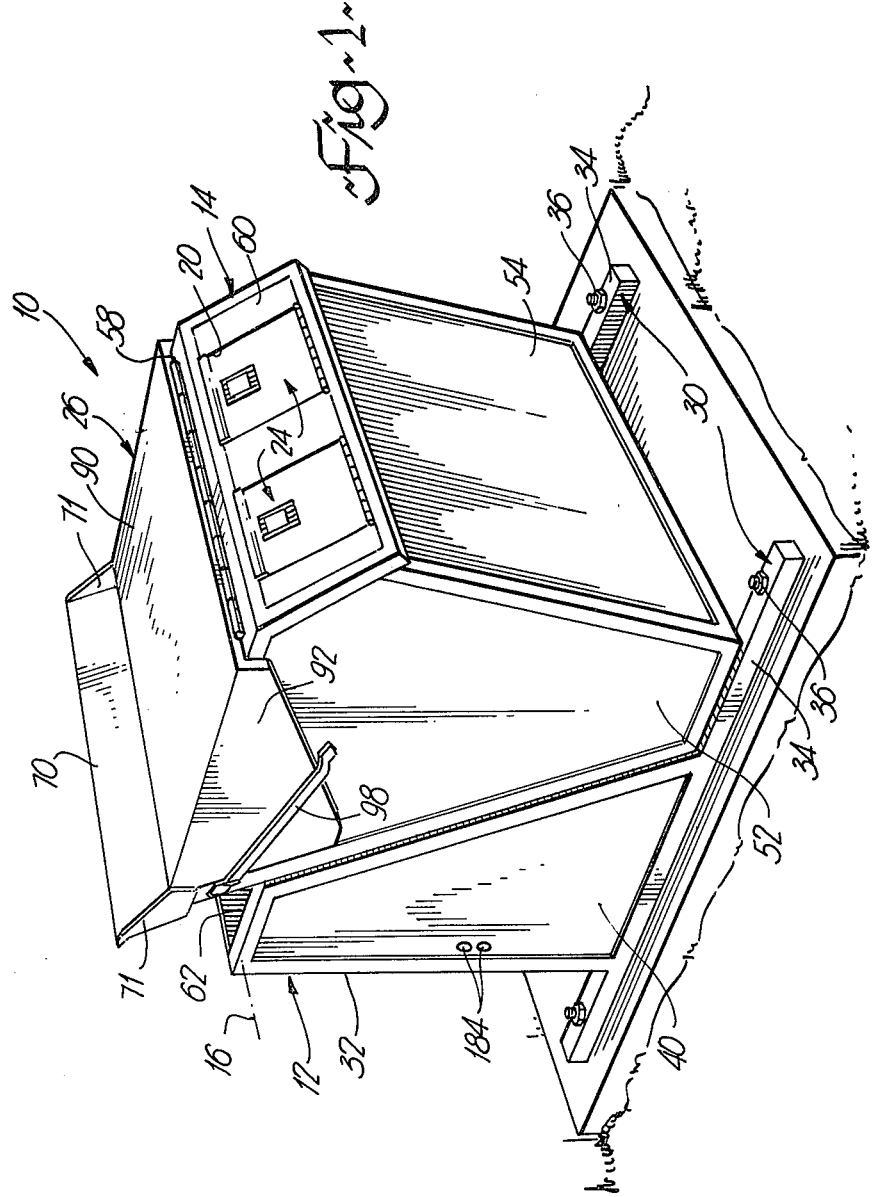
FIG. 1 is a perspective view of the apparatus of the present invention in a refuse material receiving opening.

FIG. 1 is a perspective view of the refuse containing and discharging apparatus of the present invention. The apparatus is generally designated by reference numeral 10. It includes a frame 12 and a container 14 pivotally mounted upon the frame 12 for pivotal movement in a vertical plane about a horizontal axis 16. Power means, generally designated by reference numeral 18, is effective to pivot the container 14 about axis 16 from a normal, lower position, illustrated in FIG. 2, in which position it is adapted to receive refuse material and an elevated, discharge position, illustrated in FIG. 3, in which position it is adapted to discharge its contents into an appropriate refuse collection vehicle. The container is formed with at least one refuse material receiving opening 20 and a refuse material discharge opening 22. Lid means 24 and 26 serve to close the refuse material receiving and discharge openings, respectively, as will be discussed in greater detail later.

For convenience, the side of the container in which the refuse material receiving openings 20 are formed (right side in FIG. 2) will be referred to as the forward end of the apparatus while the opposite side will be referred to as the rearward end.

Frame 12 is formed with a base portion 30 and an enclosure portion 32. In the illustrated embodiment, the base is comprised simply of a pair of spaced parallel, rectangular tubular members 34. Members 34 are adapted to be secured to a supporting surface which may be the ground, concrete pad or wooden platform by appropriate anchor bolts 36.

Enclosure portion 32 includes a transversely extending, generally vertical, rear wall 38, a pair of longitudinally extending, vertical side walls 40, a rearwardly sloped or inclined front wall 42, and a horizontal, top wall 44. Enclosure 32 is formed, preferably, with tubular structural members 45 interconnected with one another and base members 34. Rear wall 38 and side walls 40, 40 are faced with steel plates 46. Front wall 42 and top wall 44 need not be faced with steel plates since they are closed by the container 14 as will become clearer later. When the apparatus is to be used in parks, campgrounds and the like, the frame must be constructed of sufficient strength to withstand any forces applied by wild animals. However, when designed for use in cities and towns, the apparatus need not be constructed as rigidly.

Container 14 is formed with a rearwardly sloped or inclined rear wall 50, generally vertical side walls 52, 52, forwardly inclined front wall 54, horizontal bottom wall 56 and horizontal top wall 58. Front wall 54 includes a rearwardly inclined wall portion 60. The inclination of rear wall 50 is the same as that of front wall 42 of enclosure 32 so the container 14 serves to removeably close wall 42. The width of the container is the same as that of enclosure 12 and base 30 so that side walls 52, 52 of the container are flush with respect to side walls 40, 40 of enclosure 32. This, it is believed, tends to provide a more aesthetically pleasing structure. The lower portion of front wall 54 is forwardly inclined so as to provide more convenient access to material receiving chutes located in wall portion 60 by users of the apparatus. Furthermore, it is thought that this shape also tends to be more aesthetically pleasing. Rear wall 50 is inclined in the above-described manner so as to reduce the pivotal travel required to fully discharge the container. It will be understood, however, the rear wall need not be inclined if so desired.

Extending rearwardly of rear wall 50 are a pair of struts or arms 62. Arms 62 extend into a transverse notch 64, formed in the upper end of rear wall 38 of enclosure 32, in which they are pivotally connected to wall 38 by pins 66. Thus, the container is pivotally mounted to the enclosure for pivotal movement in a vertical plane about the horizontal axis of pins 66. Arms 62 are located slightly inwardly of side walls 40, 40 of the enclosure and, thus, are generally within the enclosure when the container is in the position shown in FIGS. 2 and 3. The arms are interconnected by steel plates 68 so as to close the upper end of the enclosure and provide a more pleasing structure.

Rear wall 50 also includes a lip 70 at its upper end (FIG. 2) extending beyond top wall 58 and having forwardly projecting triangluar side panels 71. Lip 70 and panels 71 serve to project farther into the collecting portion of a refuse vehicle and prevent spillage.

As with frame 12, container 14 is preferably formed of tubular frame members 72 faced with steel plates 73. The precise manner of interconnecting the frame members and plates will be apparent to one skilled in the art.

The refuse discharge opening 22 is formed in top wall 58 of container 14 and preferably, the entire top wall forms the opening. Thus, the opening is rectangular, having a front edge 80, rear edge 82 and side edges 84, 84. The tubular frame member 85 at the rearward end of the top wall is secured on the outside of the steel plate forming rear wall 50, rather than on the inside as with the preferred location of the balance of the members, so that it does not present an obstruction to refuse flow during the discharging procedure.

Lid means 26 moveably closes opening 22. It includes a flat, generally rectangular panel 90 which overlies the opening and downwardly depending side panels 92, 92. The front edge 94 of panel 90 is pivotally connected to the container by a hinge 96. Lid 26 is adapted to open under the influence of gravity when the container has been pivoted to a predetermined extent as shown in FIG. 3. Side panels 92, 92 serve to prevent sideways spillage during the discharge procedure. While the lid is preferably constructed of rigid material, such as steel plates, it may be desirable to provide U-shaped brackets 98 on side walls 52, 52 of the container for preventing flapping of the panels in the wind and preventing unauthorized access to the container by either animals or humans by prying the panels upwardly. Latch means, to be described later, is also provided to prevent unauthorized access to the container, especially by animals.

Figure 2:
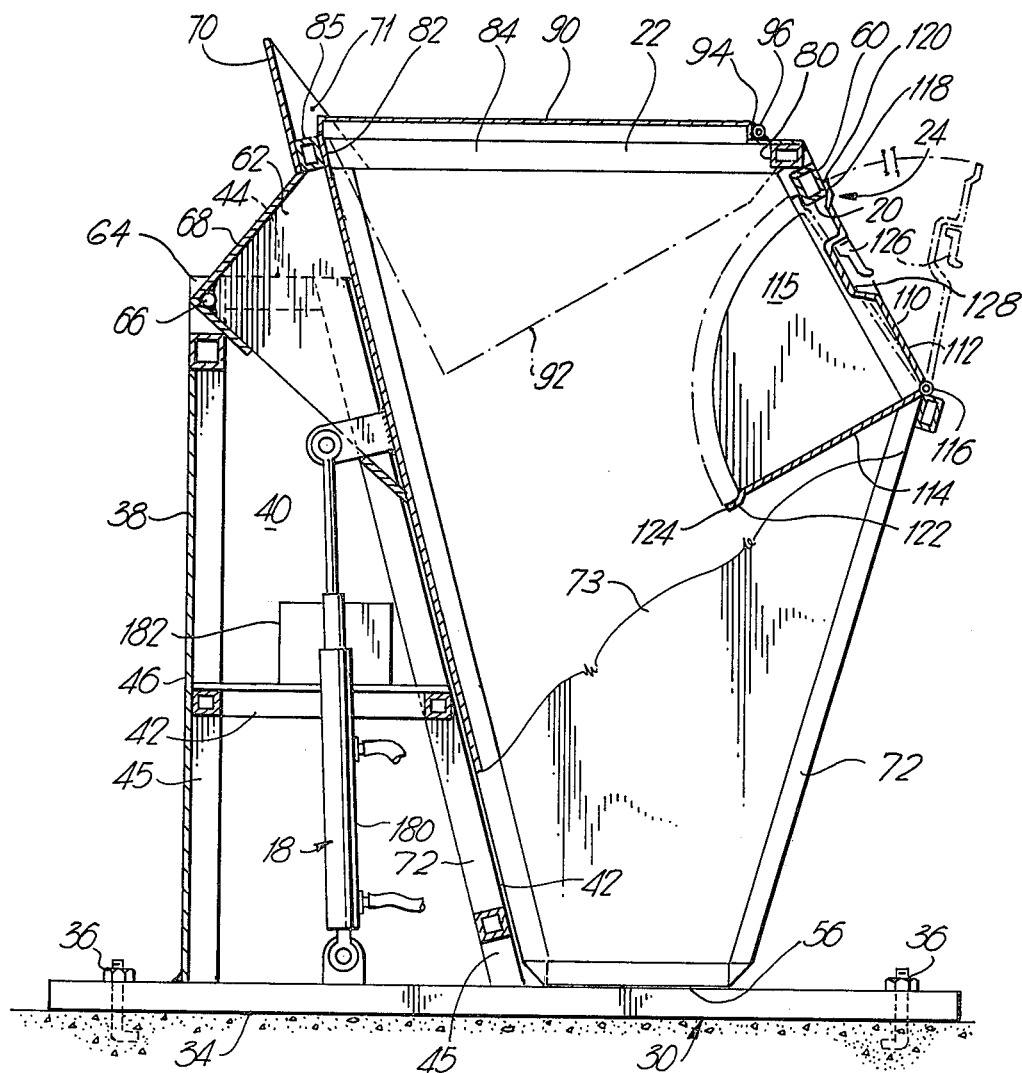
FIG. 2 is a cross-section view taken along line 2—2 of FIG. 3.
Figure 6:
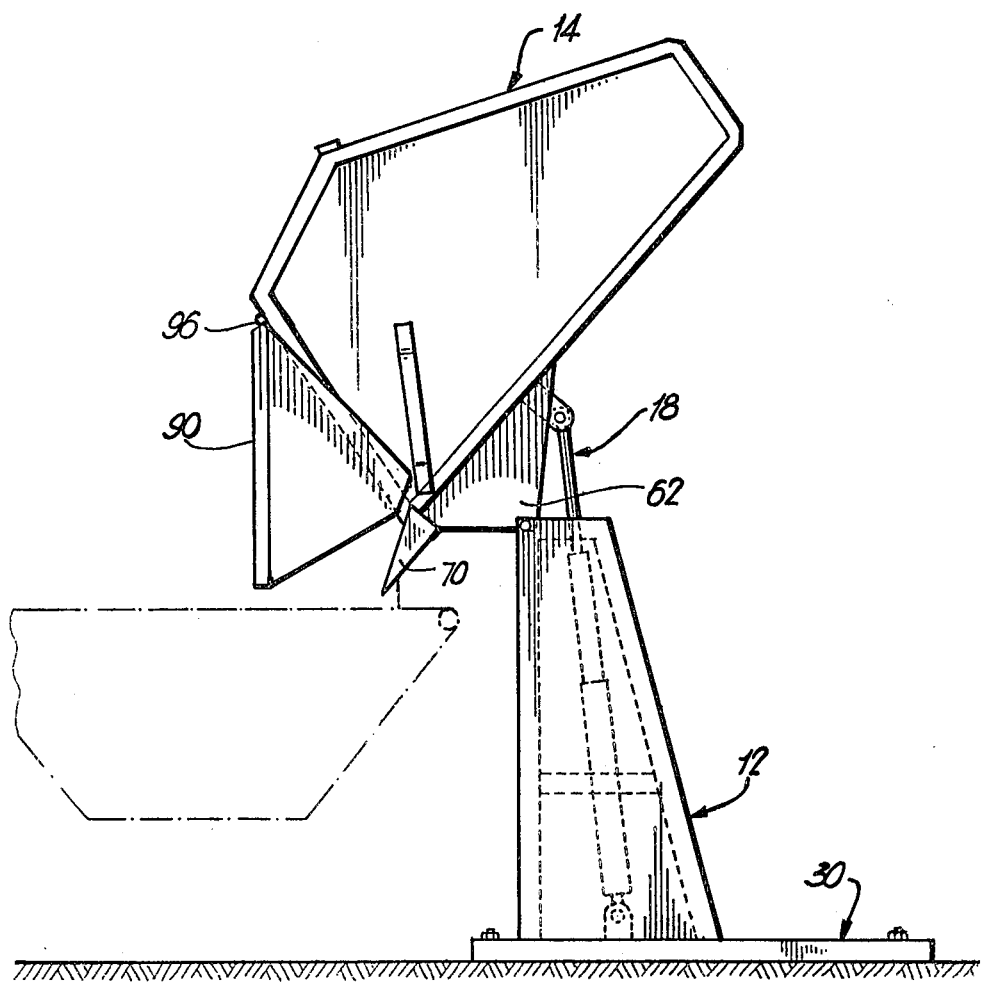
FIG. 6 is a view similar to FIG. 3 but showing the container in an elevated, discharge position.

As mentioned earlier, the refuse material receiving opening is formed in front wall portion 60. More than one opening may be provided as illustrated in FIGS. 1 and 2. Each opening 20 is generally of rectangular shape and receives any suitable lid means 24 which is effective to prevent unauthorized access to the interior of the container. A preferred form of lid means is illustrated in FIG. 2. The lid means is of the form of a V-shaped chute 110 having an outer wall 112, an inner wall 114 and a pair of arcuate side walls 115. The chute is pivotally connected to the container at the apex of walls 112 and 114 by means of a hinge 116. The outer wall is formed with an abutment 118 along its upper marginal edge 120 so as to engage the exterior side of wall portions 60 while inner wall 114 is formed with an abutment 122 along its upper edge 124 so as to engage the underside of wall portion 60. Preferably, wall portion 60 is inclined rearwardly at an angle of about 30° to the vertical and inner wall 114 extends at an angle of about 45° to the horizontal in the solid line position of FIG. 2. The need for abutment 122 may be obviated if the side walls 115 are triangular rather than arcuate such that the rearward edges of the side walls adjacent marginal edge 124 of wall 114 engage the upper edge of the opening.

The lid means is preferably provided with a latch means 126 located in a recess 128 in outer wall 112 to releasably lock the chute in the closed position illustrated in solid lines in FIG. 2. The latch mechanism is preferably such that it requires axial twisting of the wrist of the user in order to release the latch. A conventional door handle or knob requires such a movement. It has been found that bears cannot effect this movement and, therefore, cannot open the chute. Preferably, the latch is flush mounted in the chute by means of the aforementioned recess 128.

It will be appreciated that the above-described chute renders it extremely difficult to reach into the container, grasp and pull out refuse material. In operation, the chute is normally in the closed position illustrated in solid lines in FIG. 2, wherein abutment 118 rests upon the upper wall portion 60 and the latch means is engaged. To feed refuse into the container, the latch is grasped, released as described earlier and pulled back until abutment 122 engages the underside of wall portion 60 wherein wall 114 closes opening 120. Refuse is dropped into the chute between the inner and outer walls, the chute released and, as it pivots to its normally closed position, the refuse tumbles into the container. Thus, it will be seen that even if a bear succeeds in releasing the latch, it would be difficult for him to reach into the container between the inner and outer walls.

FIGS. 4 and 5 illustrate a locking means by which the lid means 26 is maintained in a closed position when the container is in the normal, lower position illustrated in FIG. 2. The latch means includes a pawl member 140, and an associated locking pin 142, located at both rearward, upper sides of the side walls 52 of the container. More specifically, each pawl member is unitary and includes two bends 144 and 146 which define three portions 148, 150 and 152. The first portion 148 lies generally in a vertical plane and extends rearwardly and upwardly at an angle of about 45°. This portion is pivotally connected to horizontal tubular frame member 90. The second portion 150 is disposed at an angle of about 90° with respect to the first portion 148 and extends upwardly at an angle of about 45°. Further, it lies in a plane which is generally parallel to the rear wall 50 of the container and extends transversely of the container. The third portion 152 is bent to an angle such that it lies in a generally horizontal plane just above lid means 26 as shown in FIGS. 4 and 5. The third portion is adapted to extend through an opening 154 in the lip of the rear wall 50 of the container. Locking pin 142 is mounted on the underside of the transversely extending frame member 85 of the container. More specifically, locking pin 142 is mounted for reciprocatory movement in a cylindrical sleeve 158 secured to the underside of the structural frame member. The outboard end of the pin is adapted to extend through a hole 160 formed in the first portion of the pawl member while the inboard end of the pin is bent at an angle of about 90° And is formed with an inwardly directed projection 162. The projection is adapted to engage an abutment such as arm 62 and prevent disengagement of the outboard end thereof with the pawl member when oriented in the position illustrated in solid lines in FIG. 5. However, when pivoted 90° in a clockwise direction (as viewed in FIG. 4) the projection will avoid arm 62 and thereby permit the pin to move inwardly out of engagement with the pawl member. This permits the pawl member to pivot in a counterclockwise direction (as also illustrated in dotted lines in FIG. 4) and the lid means 26 to pivot about its pivotal axis. It has been found that the above-described latch means is extremely simple in operation yet not readily actuatable by wild animals.

It is to be understood, however, that various alternative latch means may be provided for both lid means 24 and 26.

The container is preferably actuated by a pair of double-acting, hydraulic cylinders 180 located within enclosure 32 of frame 12. While any equivalent means may be provided for actuating the container, double-acting hydraulic cylinders are preferred because the positioning of the container may be more readily controlled. The hydraulic cylinders may themselves be actuated by a hydraulic system of a refuse collection vehicle or may be provided with an electric hydraulic pump and electric motor unit 182 located within enclosure 32. The motor may be readily connected by means of terminals 184 (FIG. 1) formed in side wall 52 to the electrical system of a refuse vehicle.

While the apparatus has been described as being particularly useful in recreational areas such as camping grounds, parks and the like, it has been found that the apparatus may also be readily adapted for use in towns and cities. In such a case, it may not be necessary to provide latch means for the feed and discharge lid means since the problem of scavenging animals may not be prevalent.

The embodiments of the invention in which an exclusive property or privilege is claimed are defined as follows:

1. A self dumping refuse container assembly, comprising:
    a support frame;
    a container mounted on said frame for pivotal movement in a vertical plane between a lower, upright position for receiving refuse material and an elevated, at least partially inverted position for discharging refuse material;
    said container having at least one refuse material intake opening, each said opening having a feed chute pivotally connected to said container and moveable between closed and opened positions, and latch means for releasably securing each said chute in a closed position;
    said container having a refuse material discharge opening, lid means for said discharge opening, said lid means being connected to said container for pivotal movement between a closed position and an open position under the influence of gravity as said container is moved between said lower and elevated positions; and
    power means for moving said container between said lower and elevated positions.

2. An apparatus as defined in claim 1,
    said frame and said container forming an enclosure for said power means when said container is in said lower position to protect said power means from the environment and vandalism.

3. An apparatus as defined in claim 2,
    said power means being located within said enclosure.

4. An apparatus as defined in claim 1,
    said lid means including latch means for locking said lid means in a closed position against scavenging animals but permitting access of at least said refuse material receiving opening to humans.

5. An apparatus as defined in claim 1,
    said power means including a pair of hydraulic cylinders.

6. An apparatus as defined in claim 5,
    said power means further including a hydraulic pump and an electric motor for driving said pump, said motor being adapted to be powered by an electrical power system of a refuse collecting vehicle.

7. An apparatus as defined in claim 6,
    said hydraulic cylinders being of the double-acting type.

8. An apparatus as defined in claim 5,
    said hydraulic cylinders being adapted to be connected to a hydraulic system of a refuse collecting vehicle.

9. A self dumping refuse container assembly, comprising:
    a frame;

a container mounted on said frame for pivotal movement in a vertical plane between a lower, upright position for receiving refuse material and an elevated, at least partially inverted position for discharging refuse material, said container having refuse material receiving and refuse material discharge openings;

lid means mounted on said container for opening and closing said openings;

said lid means including at least one refuse material feed chute pivotally connected to said container, each said chute being movable between a closed position and an open position, and having latch means releasably securing each said chute in said closed position; and power means for pivoting said container between said lower and elevated positions.

10. A self dumping refuse container assembly, comprising:

a frame;

a container mounted on said frame for pivotal movement in a vertical plane between a lower, upright position for receiving refuse material and an elevated, at least partially inverted position for discharging refuse material, said container having refuse material receiving and refuse material discharge openings;

lid means mounted on said container for opening and closing said openings;

said lid means including a lid member overlying said discharge opening and being pivotally connected to said container for pivotal movement between a normally closed position and an open, discharge position under the influence of gravity as said container is moved towards said upper position; and power means for pivoting said container between said lower and elevated positions.

11. An apparatus as defined in claim 10, said lid member further including latch means for locking said member in said normally closed position.

12. An apparatus for containing and discharging refuse, comprising:

a frame including:

a base member adapted to be secured to a supporting surface, a rear wall, a pair of side walls and a front wall rigidly secured to and extending upwardly from said base member, said front wall being inclined rearwardly, said rear walls, side walls and front wall defining an enclosure;

a container connected to the upper end of said rear wall of said frame for pivotal movement in a vertical plane about a horizontal axis between a lower position in which said container is adapted to receive refuse material and an elevated, partially inverted position in which said container is adapted to discharge its contents, said container including:

a rear wall, a front wall, a pair of side walls, a bottom wall and a top wall, said rear wall being inclined rearwardly and adapted to matingly abut said frame front wall when said container is disposed in said lower position, said front wall being generally inclined forwardly and having an upper rearwardly inclined portion, said inclined portion having at least one refuse material receiving opening and lid means disposed in said opening for selectively opening and closing said opening;

said top wall defining a refuse discharge opening and having lid means disposed thereover and being moveable between a closed position when said container is disposed in said lower position to an opened position when said container is in an elevated position to permit discharging of the contents in the container, said discharge opening lid means being moveable between said positions under the influence of gravity; and power means located within said enclosure for pivoting said container between said lower and elevated positions.

13. An apparatus as defined in claim 12, said power means including:

a pair of double-acting hydraulic cylinders, each connected between said frame and container for pivoting said container;

a pump means hydraulically connected to each said cylinder for actuating same; and electric motor means for driving said pump, said motor means being adapted to be connected to an external electrical source of power.

14. An apparatus as defined in claim 12, each said lid means including latch means for preventing access to the interior of said container.

15. An apparatus as defined in claim 14, said latch means for said discharge opening lid means including:

a pair of pawl members adapted to engage said lid means adjacent a rear marginal edge thereof, each said pawl member being mounted for pivotal movement in a generally vertical plane on the exterior side of a side wall of said container, each said pawl member being an elongated unitary bar having two bends to define first, second and third portions, said first portion being pivotally connected to one of said container side walls and extending in a generally rearward, upwardly inclined direction, said second portion extending in generally transverse plane, and inwardly of said container, said third portion extending forwardly so as to overlap a portion of the rearward end of said lid means when said lid means is in said closed position and means for locking each pawl member in a lid closing position.

16. An apparatus as defined in claim 15, said locking means including pin means engageable with said first portion, said pins means being reciprocable and pivotable about its own axis, and having a projection engageable with an abutment on said container to prevent reciprocable motion in one angular position and avoiding said abutment in another angular position.

17. An apparatus as defined in claim 12, said inclined wall portion lid means being in the form of a chute pivotally connected along a lower marginal edge to a lower marginal edge of said material receiving opening, said chute including:

an outer wall, an inner wall extending at an acute angle from said outer wall and a pair of side walls interconnecting side marginal edges of said outer and inner walls, said chute being moveable between an open material receiving position and a closed material discharging position, said outer wall being effective to close said material receiving opening in said closed position and said inner wall being adapted to close said opening in said open position.

18. An apparatus as defined in claim 17,
said outer wall including latch means for releasably locking said chute in said closed position.

19. An apparatus as defined in claim 18,
said latch means requiring an axial twist of the user's wrist to release.

20. An apparatus as defined in claim 12,
said container rear wall including a lip portion extending in the plane of said wall beyond said container top wall for reducing spillage during discharging of said container.

21. An apparatus as defined in claim 20,
wherein the opposed ends of said lip portion being bent forwardly to prevent sideways spillage during discharging of said container.

22. An apparatus as defined in claim 12,
said discharge opening lid means including a generally flat, planar portion overlying said discharge opening and being pivotally connected along a forward marginal edge thereof to said container adjacent a parallel edge of said opening, said discharge opening lid means further including depending sides overlapping said side walls of said container so as to prevent sideways spillage during discharging of said container.

23. A self dumping refuse container assembly, comprising:
a frame including:
a base member adapted to be secured to a supporting surface, a rear wall, a pair of side walls and a front wall rigidly secured to and extending upwardly from said base member, said front wall being inclined rearwardly, said rear walls, side walls and front wall defining an enclosure;
a container connected to the upper end of said rear wall of said frame for pivotal movement in a vertical plane about a horizontal axis between a lower position in which said container is adapted to receive refuse material and an elevated position in which said container is adapted to discharge its contents, said container including:
a rear wall, a front wall, a pair of side walls, a bottom wall and a top wall;
said rear wall being inclined rearwardly and adapted to matingly abut said frame front wall when said container is disposed in said lower position;
said front wall being generally inclined forwardly and having an upper rearwardly inclined portion, said inclined portion having at least one refuse material receiving opening and lid means disposed in said opening for selectively opening and closing said opening;
said top wall defining a refuse discharge opening and having lid means disposed thereover and being moveable between a closed position when said container is disposed in said lower position to an opened position when said containing is in an elevated position to permit discharging of the contents in the container, said discharge opening lid means being moveable between said positions under the influence of gravity;
power means located within said enclosure for pivoting said container between said lower and elevated positions;
said power means including:
a pair of double-acting hydraulic cylinders, each connected between said frame and container for pivoting said container;
a pump means hydraulically connected to each said cylinder for actuating same;
electric motor means for driving said pump, said motor means being adapted to be connected to an external electrical source of power;
each said lid means including latch means for preventing access to the interior of said container;
said inclined wall portion lid means being in the form of a chute pivotally connected along a lower marginal edge to a lower marginal edge of said material receiving opening;
said chute including:
an outer wall, an inner wall extending at an acute angle from said outer wall and a pair of side walls interconnecting said marginal edges of said outer and inner walls;
said chute being moveable between an open material receiving position and a closed material discharging position, said outer wall being effective to close said material receiving opening in said closed position and said inner wall being adapted to close said opening in said open position;
said outer wall including latch means for releasably locking said chute in said closed position;
said latch means requiring an axial twist of the user's wrist to release;
said container rear wall including a lip portion extending in the plane of said wall beyond said container top wall for reducing spillage during discharging of said container;
wherein the opposed ends of said lip portion being bent forwardly to prevent sideways spillage during discharging of said container;
said discharge opening lid means including a generally flat, planar portion overlying said discharge opening and being pivotally connected along a forward marginal edge thereof to said container adjacent a parallel edge of said opening, said discharge opening lid means further including depending sides overlapping said side walls of said container so as to prevent sideways spillage during discharging of said container;
said latch means for said discharge opening lid means including:
a pair of pawl members adapted to engage said lid means adjacent a rear marginal edge thereof;
each said pawl member being mounted for pivotal movement in a generally vertical plane on the exterior side of a side wall of said container;
each said pawl member being an elongated unitary bar having two bends to define first, second and third portions, said first portion being pivotally connected to one of said container side walls and extending in a generally rearward, upwardly inclined direction, said second portion extending in generally transverse plane, and inwardly of said container, said third portion extending forwardly so as to overlap a portion of the rearward end of said lid means when said lid means is in said closed position;
means for locking each pawl member in a lid closing position;
said locking means including pin means engageable with said first portion;
said pins means being reciprocable and pivotable about its own axis, and having a projection engageable with an abutment on said container to prevent reciprocable motion in one angular position and avoiding said abutment in another angular position.

* * * * *